(12) United States Patent
Fiebig et al.

(10) Patent No.: US 8,288,481 B2
(45) Date of Patent: Oct. 16, 2012

(54) POLYOLEFIN COMPOSITIONS HAVING IMPROVED OPTICAL AND MECHANICAL PROPERTIES

(75) Inventors: Joachim Fiebig, St. Marien (AT); Markus Gahleitner, Neuhofen/Krems (AT); Pirjo Jääskeläinen, Porvoo (FI); Bo Malm, Espoo (FI); Tonja Schedenig, Enns (AT)

(73) Assignee: Borealis Technology Oy, Porvoo (FI)

( * ) Notice: Subject to any disclaimer, the term of this patent is extended or adjusted under 35 U.S.C. 154(b) by 390 days.

(21) Appl. No.: 12/733,774

(22) PCT Filed: Aug. 26, 2008

(86) PCT No.: PCT/EP2008/061127
§ 371 (c)(1),
(2), (4) Date: Mar. 19, 2010

(87) PCT Pub. No.: WO2009/040201
PCT Pub. Date: Apr. 2, 2009

(65) Prior Publication Data
US 2010/0272939 A1  Oct. 28, 2010

(30) Foreign Application Priority Data
Sep. 27, 2007  (EP) ..................... 07117379

(51) Int. Cl.
*C08L 23/04*  (2006.01)
*C08L 23/10*  (2006.01)

(52) U.S. Cl. ........................ 525/191; 525/240
(58) Field of Classification Search .................. 525/191, 525/240
See application file for complete search history.

(56) References Cited

U.S. PATENT DOCUMENTS

| | | | |
|---|---|---|---|
| 6,187,402 B1 | 2/2001 | Ek et al. | |
| 6,218,010 B1 * | 4/2001 | Georgellis et al. | ............ 428/373 |
| 6,221,974 B1 | 4/2001 | Härkönen et al. | |
| 6,716,921 B1 | 4/2004 | Nakashima et al. | |
| 2003/0194575 A1 | 10/2003 | Tau et al. | |
| 2004/0266952 A1 | 12/2004 | Pelliconi et al. | |

FOREIGN PATENT DOCUMENTS
EP  1 448 622 B1  4/2006

* cited by examiner

*Primary Examiner* — Nathan M Nutter
(74) *Attorney, Agent, or Firm* — Warn Partners, P.C.

(57) ABSTRACT

Novel polyolefin compositions comprising (A) a first propylene-ethylene random copolymer and (B) a second propylene-ethylene random copolymer, wherein the polyolefin composition has an ethylene content $CM_{AB}$ of 1-10 wt % and an MFR(AB) of 3-20 g/10 min with the proviso that $CM_{AB} > CM_A$ and MFR(A)/MFR(AB)>1.45 and where the polyolefin composition further has a randomness R of the ethylene distribution in the polymer chain of ≧0.945. Articles made from the novel polyolefin compositions have excellent optical properties even after subjecting them to a heat sterilization step.

18 Claims, No Drawings

POLYOLEFIN COMPOSITIONS HAVING IMPROVED OPTICAL AND MECHANICAL PROPERTIES

This application is a National Stage of International Application No. PCT/EP2008/061127, filed Aug. 26, 2008. This application claims priority to European Patent Application No. 07117379.3 filed on Sep. 27, 2007. The disclosures of the above applications are incorporated herein by reference.

The present invention relates to polyolefin compositions and a process for the production thereof. The present invention further relates to articles comprising the above polyolefin compositions which have improved optical properties even after subjecting them to a sterilisation step which makes them highly attractive for food and medical applications.

Polyolefins such as polyethylene and polypropylene are widely used for packaging applications and increasingly applied also in the medical area and for pharmaceutical packaging where the material is mostly sterilised. Especially suited for these applications are propylene random copolymers. Especially in food packaging and medical applications, films made of or essentially consisting of propylene random copolymers have to be sterilised. The most common sterilisation procedures are the use of heat (steam), radiation (beta radiation, electrons or gamma radiation) or chemicals (usually ethylene oxide). This sterilisation procedure affects the mechanical and optical properties, but sometimes also the organoleptic properties of the material significantly.

Steam sterilisation, usually carried out in a temperature range of 120 to 130° C., results mostly in post-crystallisation and physical ageing effects of the polypropylene. Moreover, the material tends to become stiffer and more brittle. Also optical disturbances are severely increased and significantly increase the haze of transparent articles.

Especially in steam sterilisation, performed at 121° C. for 30 min, the crystallinity of films made of alpha-olefin copolymers significantly increases, resulting in a modulus and haze increase together with significant embrittlement. Thus, a reduction of the impact strength is further observed.

To overcome the above drawbacks, it has been tried to increase the homogeneity of monomer incorporation into the polymer chain of a propylene copolymer. In the field of packaging, propylene-ethylene random copolymers have gained increasing interest due to their improved transparency, relative softness, lower sealing temperature and moderate low-temperature impact strength. Nevertheless, the incorporation of comonomers into the propylene polymer chain concentrates stereo defects into the polymer chains, which in turn are leading to intermolecular heterogeneity of the propylene copolymer. Such heterogeneity increases the above outlined drawbacks, especially after performing sterilisation on films made of such propylene copolymer compositions.

In view of the above problems, several proposals have been made to achieve polyolefin compositions which can be manufactured into films with improved optical and mechanical properties.

EP 1 008 626 A1 proposes a hollow vessel for heat sterilisation made of a polyolefin resin which is superior in transparency and impact strength and causes minor emission of smell and preserves these properties even after subjecting to heat sterilisation with steam. The material is characterised by a haze value difference, Δ haze, between the haze value after sterilisation and the haze value before sterilisation of 1 to 20%, determined according to ASTM D1330 for a resin specimen of a thickness of 0.5 mm when the heat sterilisation treatment is performed at a temperature of 121° C. for 20 min. In any case, the above Δ haze value range is still unsatisfactory.

U.S. Pat. No. 6,231,936 B1 discloses articles such as packaging materials and medical devices having enhanced tolerance to radiation and heat, produced from a blend of from about 99 wt.-% to 50 wt % homo- or copolymerised polypropylene and about 1 wt.-% to 50 wt.-% polyethylene produced by single-site catalysis. The polymer blends described in this document typically comprise homopolypropylene and polyethylene produced by single-site catalysis, preferably using a metallocene catalyst. Propylene random copolymers may also be incorporated. The document reports on improving effects as to resistance to embrittlement and coloration when a specific single-site catalysed polyethylene is admixed to polypropylene.

WO 03/064522 A1 discloses a non-rigid or flexible material which is sterilisable using steam at a temperature of at least 121° C. and/or by irradiation wherein the material comprises a specific polypropylene characterised by its melting temperature and its modulus in flexure (Emod). The document reports on preservation of a haze transparency index of less than 10% and a gloss brightness index of more than 80% after steam sterilisation at a temperature of at least 121° C. From these materials films may be made which are suitable for pharmaceutical and medical applications. No detectable transfer of components contained in the film into a solution which was stored in bags made of that film, is observed.

In view of the above proposals, the improvements in alpha-olefin copolymer resins are still unsatisfactory for achieving superior characteristics in optical properties after sterilisation and simultaneous superiority of mechanical properties after sterilisation.

Therefore, it is an object of the present invention to provide improved polyolefin compositions which overcome the above discussed disadvantages.

It is a further object of the present invention to provide a process for the preparation of such polyolefin compositions having improved optical and mechanical properties.

Moreover, it is an object of the present invention to provide films comprising the above polyolefin compositions.

Even more, it is an object of the present invention to use the above alpha-olefin polymer compositions in medical and food applications.

The present invention is based on the finding that the above discussed disadvantages of the prior art can be overcome by a specific design of a polyolefin composition comprising (A) a first propylene-ethylene random copolymer having an ethylene content $CM_A$ of 0.5-8 wt % and an MFR(A) of 5-40 g/10 min and (B) a second propylene-ethylene random copolymer, wherein the polyolefin composition has an ethylene content $CM_{AB}$ of 1-10 wt % and an MFR(AB) of 3-20 g/10 min with the proviso that $CM_{AB} > CM_A$ and MFR(A)/MFR(AB)>1.45 and where the polyolefin composition further has a randomness R of the ethylene distribution in the polymer chain of $\geq 0.945$.

Accordingly, the invention is based on a polyolefin composition which contains at least two different propylene-ethylene random copolymers. These propylene-ethylene random copolymers are different with respect to their ethylene content. The ethylene content $CM_B$ of (B) is greater than the ethylene content $CM_A$ of (A), resulting also in an ethylene content $CM_{AB}$ of the polyolefin composition being greater than the ethylene content $CM_A$ of (A). Further, the propylene-ethylene random copolymers are different with respect to their MFR. The MFR(B) of (B) is smaller than the MFR(A) of (A), resulting also in an MFR(AB) of the polyolefin composition which is smaller than the MFR(A) of (A) to such an extent, that the ratio MFR(A)/MFR(AB) is greater than 1.45.

Still further, the invention is based on an overall randomness R of the ethylene distribution in the propylene polymer chains of at least 0.945.

The randomness R as used herein is defined as the ratio of the amount of randomly incorporated ethylene to the total amount of ethylene of the propylene-ethylene random copolymer. The total amount of ethylene is the sum of the respective amounts of randomly incorporated ethylene and the amount of ethylene which is incorporated in a blocky manner. Both amounts ("random-ethylene" and "blocky-ethylene") are determined with FTIR. The total concentration of ethylene corresponds to the peak height at 733 cm$^{-1}$. The concentration of blocky-ethylene corresponds to the area of a peak at 720 cm$^{-1}$. The concentration of random-ethylene is calculated as the difference of total ethylene minus blocky-ethylene. The respective amounts of ethylene are determined from the FTIR spectrum by using calibration curves established with $^{13}$C-NMR.

By way of a slightly different alternative definition, the object of the present invention is achieved by a polyolefin composition comprising
(A) a first propylene-ethylene random copolymer having an ethylene content $CM_A$ of 0.5-8 wt % and an MFR(A) of 5-40 g/10 min and
(B) a second propylene-ethylene random copolymer, wherein the polyolefin composition has an ethylene content $CM_{AB}$ of 1-10 wt % and an MFR(AB) of 3-20 g/10 min with the proviso that $CM_{AB}>CM_A$ and where the polyolefin composition shows a broadness B of 0.67 or more and where the polyolefin composition further has a randomness R of the ethylene distribution in the polymer chain of $\geq 0.945$.

The definitions of comonomer contents and randomness are as above. Additionally, the overall polyolefin composition is characterised by a broadness B of at least 0.67.

The broadness B as used herein is determined using the Carreau-Yasuda equation:

$$\eta(\dot{\gamma})=\eta_0[1+(\lambda\dot{\gamma}^B)]^{(n-1)/B}$$

with $\eta_0$ being the zero shear viscosity, $\lambda$ the characteristic relaxation time identical to the inverse of the critical shear rate $\dot{\gamma}_{crit}$ (being the shear rate at the intersection between the zero shear rate line at low and the power law region at high shear rates), n the "power law index" at high shear rates and B the transition broadness parameter. The model parameters of this flow curve model can be correlated to characteristic quantities of the molecular weight distribution (Bernreitner et al., Polym. Testing 11, 89, 1992). Details of the parameter determination can also be found in the aforementioned literature.

For each of the above described embodiments the polyolefin compositions of the present invention are characterised by a certain modality of the composition (i.e. a broadness of the molecular weight distribution) which can either be expressed as the above specified MFR ratio or as the above specified broadness B in each case in combination with a high randomness R of the ethylene distribution in the polymer chain. As a result, the polyolefin compositions of the invention are highly suited for transparent film applications, where the films are sterilised or pasteurised.

Sterilisation with steam is carried out in the art between 120° C. and 130° C., preferably at 121° C. for 10 minutes to 1 hour, preferably for 30 min. Other less aggressive techniques such as pasteurisation usually carried out between 60 and 90° C. for less than 30 min may also be used. Sterilisation by irradiation is a further option.

Sterilisation as used herein is carried out by a treatment with saturated steam at 121° C. for 30 minutes. Where in this application the term "sterilisation" is used, it stands for these conditions mentioned above.

It is the specific finding of the present inventors that superior resistance to sterilisation, especially steam sterilisation can be obtained with articles produced from polyolefin compositions of the invention when the ethylene content and the MFR-ratio or broadness B in the copolymers are adjusted to the specified values and when the incorporation of the comonomer is obtained in a particularly homogeneous manner to avoid stereodefects as far as possible.

According to the first embodiment of the present invention, the MFR-ratio MFR(A)/MFR(AB) is greater than 1.45, preferably at least 1.60, more preferably at least 1.70 and most preferably at least 1.80.

According to the second embodiment of the present invention, the broadness parameter B is greater than 0.67, preferably at least 0.68, more preferably at least 0.69 and most preferably at least 0.70.

The polyolefin compositions of the present invention have an MFR(AB) of 3-20 g/10 min, preferably 5-17 g/10 min, more preferably 7-15 g/10 min, most preferably 9-14 g/10 min.

According to an embodiment of the present invention the propylene-ethylene random copolymer (A) has an MFR(A) of 5-100 g/10 min, preferably of 5-50 g/10 min, more preferably of 10-40 g/10 min, most preferably of 15-30 g/10 min.

The MFR(B) of the second propylene-ethylene random copolymer is selected such that the required MFR ratio of MFR(A)/MFR(AB)>1.45 is fulfilled. It has surprisingly been observed, that when this criterion is fulfilled, a particularly improved sterilisation resistance can be achieved.

An essential requirement for the polyolefin compositions of the present invention is certain minimum randomness of the ethylene distribution in the polymer chain, which is required to be at least 0.945.

It is especially preferable that the propylene-ethylene random copolymers used in the present invention show a randomness R of the ethylene distribution in the polymer chain of $\geq 0.950$. A higher R value is indicative for a more homogeneous (i.e. random) incorporation of the ethylene in the polymer chain. The sterilisation resistance generally increases with higher randomness.

In the inventive polyolefin compositions the ethylene content $CM_A$ of the first propylene-ethylene random copolymer (A) is generally between 0.5-8 wt %. Preferably the ethylene content $CM_A$ of the first propylene-ethylene random copolymer (A) is between 0.8-7 wt %, more preferably 1.0-6 wt % and most preferably 1.5-5 wt %. According to a further preferred embodiment the ethylene content $CM_A$ of the first propylene-ethylene random does not exceed 4 wt %, still further preferably, $CM_A$ does not exceed 3 wt %.

In the inventive polyolefin compositions the total ethylene content $CM_{AB}$ of the polyolefin composition is generally between 1-10 wt %. The total ethylene content $CM_{AB}$ is always higher than the ethylene content of the first propylene-ethylene random copolymer (A), therefore also the ethylene content of the second propylene-ethylene random copolymer (B) is higher than $CM_A$. Preferably the ethylene content $CM_{AB}$ of the polyolefin composition is 1.5-8 wt %, more preferably 2-7 wt %, most preferably 2.5-6 wt %. According to a further preferred embodiment the ethylene content $CM_{AB}$ does not exceed 5 wt %, still further preferably, $CM_{AB}$ does not exceed 4 wt %.

Preferably, the ratio $CM_{AB}/CM_A$ is from 1.1 to 3, more preferably 1.2 to 2.5 and still more preferably 1.3 to 2.0, most preferably 1.4 to 1.8.

The polyolefin compositions of the present invention generally have a polydispersity ($M_w/M_n$) of $\geq 4$, preferably of $\geq 4.3$, more preferably of $\geq 4.5$.

For the polyolefin compositions of the present invention, it is preferred that they contain effective amounts of both propylene-ethylene random copolymers (A) and (B). Accordingly, the polyolefin compositions of the present invention contain in the broadest scope 20-80 wt % propylene-ethylene random copolymer (A) and 80-20 propylene-ethylene random copolymer (B). Preferably, the polyolefin compositions contain 30-70 wt % (A), more preferably 40-60 wt % (A) and most preferably 45-55 wt % (A). Preferably the polyolefin compositions contain 70-30 wt % (B), more preferably 60-40 wt % (B) and most preferably 55-45 wt % (B).

The polyolefin compositions of the present invention may contain commonly used additives like: phenolic antioxidants phosphorus-containing antioxidants, C-radical scavengers, acid scavengers, UV-stabilisers, antistatic agents, nucleating agents, slip agents, and antiblocking agents. These components are well known for the skilled person and may be used in the common amounts and are selected by the skilled person as they are required and according to the respective purpose for which the polyolefin compositions shall be used. Accordingly, it is also understood that the sum of the weights of the propylene-ethylene random copolymers do usually not exactly add up to 100 wt %, but somewhat less, depending upon the amount of additives, which—in total—do usually not exceed 5 wt %.

The polyolefin compositions of the present invention may also be used to prepare blends with further polyolefins, like polyethylene (LLDPE, LDPE, HDPE, MDPE, VLDPE), ethylene-propylene rubber (EPR), etc. For such blends it is preferred that the final blend does not contain more than 20 wt % of the further polyolefin(s).

Specific advantages with respect to sterilisation resistance may be obtained if the relationship between comonomer content $CM_{AB}$ and melting point of the polyolefin composition satisfies the following relation $$T_m \leq 162.5 - 5.4 * CM_{AB},$$

wherein $CM_{AB}$ denotes the ethylene content in wt % of the polyolefin composition and $T_m$ is the melting temperature in ° C. of the polyolefin composition, determined by differential scanning calorimetry (DSC).

The polyolefin composition according to preferred embodiments of the present invention has a melting temperature below 160° C., more preferred below 150° C. It is preferred that the melting point of the polyolefin composition is at least 125° C., preferably at least 130° C.

The inventive polyolefin compositions are typically used for obtaining films from which articles for the desired end-use are manufactured. The films may be prepared by any process known to the skilled person, but are preferably produced by a cast process or a blown film process. A roll stack process may also be used.

Cast Film Technology

In this technology for producing polymer films, the molten polymer is extruded through a slot die fed by a (normally single-screw) extruder onto a first cooled roll, the so-called chill-roll. From this roll, the already solidified film is taken up by a second roll (nip roll or take-up roll) and transported to a winding device after trimming the edges.

Blown Film Technology with Water Contact Cooling Ring

In this technology for producing polymer films, the molten polymer is extruded through a tubular die fed by a (usually single-screw) extruder and blown up to a tube. The film tube has contact on the exterior side to a water cooling ring and is cooled down quickly. The already solidified film tube is flattened afterwards by take-up rolls and taken off to a winder.

For a more detailed description see "Polypropylene Handbook", edited by Edward P. Moore, Jr., Hanser Publishers, 1996.

Blown Film Technology with Air Quench

In this manufacturing step for air quenched blown films the film is made using at least a 1.5 blow up ratio, preferably at least a 2.0 blow up ratio, more preferably at least a 2.5 blow up ratio.

The technique of air quenched blown film extrusion is well known for the production of thin plastic films. In an advantageous process, plastics, such as low, linear low and high density polyethylene are extruded through a circular die to form a film. Air is introduced through the centre of the die to maintain the film in the form of a bubble which increases the diameter of the film about 1.5 to 6 fold, after which the bubble is collapsed onto rollers. There are a number of variations of such a process within the skill in the art. Most references to blowing polyolefin films disclose processes used for polyethylene, but these are applicable to the polyolefin compositions of the invention with few modifications within the skill in the art without un-due experimentation.

For instance cooling is often advantageously modified because the art recognises that polypropylene cools and crystallises at a rate different from that of polyethylene.

Therefore, adjustments to the cooling parameters often produce a more stable bubble at desired output rates.

In the formation of blown films, the polymer melt enters a ring-shaped die either through the bottom or side thereof. The melt is forced through spiral grooves around the surface of a mandrel inside the die and extruded through the die opening as a thick-walled tube. The tube is expanded into a bubble of desired diameter and correspondingly decreased thickness as previously described.

Monoaxially Oriented Polypropylene Film (MOPP)

Based on a cast film, a solid-state orientation step below the melting temperature is applied before winding.

Biaxially Oriented Polypropylene Film (BOPP)

Two main technologies are used for this process, which are described in detail in A. Ajji & M. M. Dumoulin, Biaxially oriented polypropylene (BOPP) process, in: J. Karger-Kocsis (Ed.) Polypropylene: An A-Z Reference, Kluwer, Dordrecht 1999, 60-67.

Articles, in particular films according to the present invention are advantageously used in packaging applications, for example for food packaging, in particular as food wrapping film.

A particularly preferred application of polyolefin compositions according to the invention are medical articles made from or comprising a material or film according to the present invention. Such a medical article may be designed so that the material or film of the invention at least in part contacts a biological or therapeutic material when the article is used.

Articles, e.g. containers comprising the materials and films of the invention are suitable for e.g. holding and/or storing a therapeutic fluid, forming a conduit or tube guiding a therapeutic fluid, holding and/or storing and/or guiding blood or a constituent thereof or a biological tissue or drugs, proteins or peptides, for example monoclonal antibodies; or collecting a biological fluid or material, more particularly as a drainage bag.

The present invention is also directed to a process for sterilising an article wherein the article comprises a polyolefin composition as defined in accordance with the present invention. Preferably, the sterilisation process is performed at elevated temperature. Still more preferably, the sterilisation is a steam sterilisation and is carried out at a temperature of between 120 to 130° C., most preferably at 121° C. for 30 minutes.

Production of Propylene-Ethylene Random Copolymer

The polymerisation process for the production of the propylene-ethylene random copolymers may be a continuous process or a batch process utilising known methods and operating in liquid phase, optionally in the presence of an inert diluent, or in gas phase or by mixed liquid-gas techniques.

Accordingly, the propylene-ethylene random copolymers may be produced by single- or multistage process polymerisations of propylene and ethylene such as bulk polymerisation, gas phase polymerisation, slurry polymerisation, solution polymerisation or combinations thereof using catalysts as described below. Preferably, a copolymer is made either in one or two loop reactor(s) or in a combination of loop and gas phase reactor. Those processes are well known to one skilled in the art.

According to an embodiment of the present invention, the propylene-ethylene random copolymers (A) and (B) are polymerised separately. For finally obtaining the polyolefin composition, (A) and (B) are compounded together with any required additives.

According to a preferred embodiment of the present invention, the polyolefin composition is produced in a polymerisation process based on a first polymerisation step in at least one slurry reactor and a second polymerisation step preferably comprising at least one gas phase reactor. Preferred slurry reactors are loop reactors.

Preferred reactor arrangements for producing the random propylene copolymer are two consecutive loop reactors or a loop reactor followed by a gas phase reactor.

Before the catalyst system is used in the actual polymerisation process it is typically pre-polymerised with small amounts of α-olefins, preferably propylene, in order to enhance catalyst performance and to improve the morphology of the end product.

In the first polymerisation step of the process the optionally prepolymerised catalyst system and a monomer feed comprised of propylene and ethylene is fed into a reactor. The amount of comonomer in the feed can be up to 12 wt %. The possible maximum amount of ethylene in the feed is depending upon whether propylene-ethylene random copolymer (A) or (B) is produced in the first polymerisation step. If (A) is produced in the first polymerisation step, ethylene content in the feed can be up to ca. 8 wt %, resulting in an ethylene content of (A) of not more than 8 wt %.

Polymerisation can be carried out in the presence of the catalyst system at temperatures lower than 110° C. and pressures in the range of 10 to 100 bar, preferably 30 to 70 bar. Preferably, the polymerisation is carried out under such conditions that 20 to 80 wt %, preferably 30 to 70 wt % of the end product is polymerised in the first reactor.

Hydrogen is added, when desired, into the first reactor for adjusting the molecular weight of polymer, as conventional.

After the polymerisation is complete in the first reactor, the reaction medium is transferred into a second reactor, which can be a gas phase reactor. If the second reactor is also a loop reactor, the same range of polymerisation conditions is available as for the first reactor.

In the second reactor, 80 to 20 wt %, preferably 70 to 30 wt % of the final polymer is formed. In the second reactor, if it is a gas phase reactor, the polymerisation can be carried out at a temperature of 60 to 90° C. and at a pressure higher than 5 bar, preferably higher than 10 bar. Propylene and ethylene can be added into the second reactor. Hydrogen can also be added into the gas phase reactor, if desired.

The precise control of the polymerisation conditions and reaction parameters is within the state of the art. After the polymerisation in the first and the optional second reactor is finished, the polymer product is recovered by conventional procedures.

The resulting polymer particles may be pelletised in a conventional compounding extruder with various additives, which are generally used in thermoplastic polymer compositions, such as stabilisers, antioxidants, acid neutralising agents, ultraviolet absorbers, antistatic agents, etc.

The catalyst system, which is preferably used in the polymerisation of the propylene-ethylene random copolymers used in the present invention comprises a group 2 metal and a group 4-6 metal-containing catalyst which comprises an internal electron donor. The catalyst system further comprises a co-catalyst including an aluminium alkyl compound; and an external electron donor including a silane compound. Specific examples for catalyst systems useable according to the present invention are disclosed e.g. in WO 03/000754, and EP 1 484 345, which are all incorporated by reference herein.

According to a preferred embodiment of a process for producing such a catalyst, it is provided in form of particles having a predetermined size range. Such a preferred process comprises the steps of:

a) preparing a solution of a complex of a Group 2 metal and an electron donor by reacting a compound of said metal with said electron donor or a precursor thereof in an organic liquid reaction medium;

b) adding said solution of said complex to at least one compound of a transition metal of any of groups 4-6 to produce an emulsion the dispersed phase of which contains more than 50 mol % of the Group 2 metal in said complex;

c) agitating the emulsion, optionally in the presence of an emulsion stabilizer, in order to maintain the droplets of said dispersed phase within an average particle size range of suitably 5 to 200 μm, preferably 10 to 100 μm, even more preferably 20 to 50 μm;

d) solidifying said droplets of the dispersed phase; and e) recovering the obtained solidified particles of the olefin polymerisation catalyst.

A preferred process for producing the polyolefin compositions of the present invention comprises the abovementioned steps for producing the olefin polymerisation catalyst, and subsequently producing a first propylene-ethylene random copolymer (A) having an ethylene content $CM_A$ of 0.5-8 wt % and an MFR(A) of 5-40 g/10 min by polymerising propylene and ethylene in the presence of an olefin polymerisation catalyst system comprising the olefin polymerisation catalyst a cocatalyst including an aluminium alkyl compound, and an external donor including a silane compound, and producing a second propylene-ethylene random copolymer (B) by polymerising propylene and ethylene in the presence of the olefin polymerisation catalyst system, such that the polyolefin composition has an ethylene content $CM_{AB}$ of 1-10 wt % and an MFR(AB) of 3-20 g/10 min with the proviso that $CM_{AB} > CM_A$ and MFR(A)/MFR(AB)>1.45 and a randomness R of the ethylene distribution in the polymer chain of $\geq 0.945$.

A further preferred process for producing the polyolefin compositions of the present invention comprises the abovementioned steps for producing the olefin polymerisation catalyst, and subsequently producing a first propylene-ethylene random copolymer (A) having an ethylene content $CM_A$ of 0.5-8 wt % and an MFR(A) of 5-40 g/10 min by polymerising propylene and ethylene in the presence of an olefin polymerisation catalyst system comprising the olefin polymerisation catalyst
a cocatalyst including an aluminium alkyl compound, and
an external donor including a silane compound, and producing a second propylene-ethylene random copolymer (B) by polymerising propylene and ethylene in the presence of the olefin polymerisation catalyst system, such that the polyolefin composition has an ethylene content $CM_{AB}$ of 1-10 wt % and an MFR(AB) of 3-20 g/10 min with the proviso that $CM_{AB} > CM_A$ and the polyolefin composition has a broadness B of 0.67 or more and a randomness R of the ethylene distribution in the polymer chain of $\geq 0.945$.

A randomness R of the ethylene distribution in the polymer chain of $\geq 0.945$ is achieved by using the olefin polymerisation catalyst system as described herein.

The Group 2 metal used in the preparation of the catalyst is preferably magnesium and the liquid organic medium for reacting the group 2 metal compound preferably comprises a $C_6$-$C_{10}$ aromatic hydrocarbon, preferably toluene.

An electron donor compound to be reacted with the Group 2 metal compound preferably is a mono- or diester of an aromatic carboxylic acid or diacid, the latter being able to form a chelate-like structured complex. Said aromatic carboxylic acid ester or diester can be formed in situ by reaction of an aromatic carboxylic acid chloride or diacid dichloride with a $C_2$-$C_{16}$ alkanol and/or diol, and is preferably dioctyl phthalate or bis-(2-ethylhexyl) phthalate.

The reaction for the preparation of the Group 2 metal complex is generally carried out at a temperature of 20 to 80° C., and in case that the Group 2 metal is magnesium, the preparation of the magnesium complex may advantageously be carried out at a temperature of 50 to 70° C.

The compound of a group 4-6 metal is preferably a compound of a Group 4 metal. The Group 4 metal is preferably titanium, and its compound to be reacted with the complex of a Group 2 metal is preferably a halide.

In a still further embodiment of the invention, the compound of a group 4-6 metal can also be selected from Group 5 and Group 6 metals, such as Cu, Fe, Co, Ni and/or Pd compounds.

In a preferred embodiment of the production process of the catalyst a turbulence minimizing agent (TMA) is added to the reaction mixture before solidifying said particles of the dispersed phase, the TMA being inert and soluble in the reaction mixture under the reaction conditions.

The turbulence minimizing agent (TMA) or mixtures thereof are preferably polymers having linear aliphatic carbon backbone chains, which might be branched with only short side chains in order to serve for uniform flow conditions when stirring. Said TMA is in particular preferably selected from α-olefin polymers having a high molecular weight Mw (as measured by gel permeation chromatography) of about 1 to 40×10$^6$, or mixtures thereof. Especially preferred are polymers of α-olefin monomers with 6 to 20 carbon atoms, and more preferably polyoctene, polynonene, polydecene, polyundecene or polydodecene or mixtures thereof, having the molecular weight and general backbone structure as defined before, and most preferably TMA is polydecene.

Usually, said turbulence minimizing agent can be added in any process step before particle formation starts, i.e. at the latest before solidification of the emulsion, and is added to the emulsion in an amount of 1 to 1000 ppm, preferably 5 to 100 ppm and more preferable 5 to 50 ppm, based on the total weight of the reaction mixture.

A preferred embodiment of the process for producing catalysts used for preparing propylene-ethylene random copolymer for the present invention comprises: preparing a solution of a magnesium complex by reacting an alkoxy magnesium compound and an electron donor or precursor thereof in a $C_6$-$C_{10}$ aromatic liquid reaction medium comprising $C_6$-$C_{10}$ aromatic hydrocarbon or a mixture of $C_6$-$C_{10}$ aromatic hydrocarbon and $C_5$-$C_9$ aliphatic hydrocarbon; reacting said magnesium complex with a compound of at least one fourvalent group 4 metal at a temperature greater than 10° C. and less than 60° C., to produce an emulsion of a denser, $TiCl_4$/toluene-insoluble, oil dispersed phase having group 4 metal/Mg mol ratio 0.1 to 10 in an oil disperse phase having group 4 metal/Mg mol ratio 10 to 100; maintaining the droplets of said dispersed phase within the size range 5 to 200 μm by agitation in the presence of an emulsion stabiliser while heating the emulsion to solidify said droplets and adding turbulence minimising agent into the reaction mixture before solidifying said droplets of the dispersed phase, said turbulence minimising agent being inert and soluble in the reaction mixture under the reaction conditions; and solidifying said particles of the dispersed phase by heating and recovering the obtained catalyst particles.

The said disperse and dispersed phases are thus distinguishable from one another by the fact that the denser oil, if contacted with a solution of titanium tetrachloride in toluene, will not dissolve in it. A suitable $TiCl_4$/toluene solution for establishing this criterion would be one having a $TiCl_4$/toluene mol ratio of 0.1 to 0.3. The disperse and dispersed phase are also distinguishable by the fact that the great preponderance of the Mg provided (as complex) for the reaction with the Group 4 metal compound is present in the dispersed phase, as revealed by comparison of the respective Group 4 metal/Mg mol ratios.

In effect, therefore, virtually the entirety of the reaction product of the Mg complex with the Group 4 metal, which is the precursor of the final catalyst, becomes the dispersed phase, and proceeds through the further processing steps to the final dry particulate form. The disperse phase, still containing a useful quantity of Group 4 metal, can be reprocessed for recovery of that metal.

The production of a two-phase, rather than single-phase reaction product is encouraged by carrying out the Mg complex/Group 4 metal compound reaction at low temperature, specifically above 10° C. but below 60° C., preferably between 20° C. and 50° C. Since the two phases will naturally tend to separate into a lower, denser phase and supernatant lighter phase, it is necessary to maintain the reaction product as an emulsion by agitation, preferably in the presence of an emulsion stabiliser.

The resulting particles from the dispersed phase of the emulsion are of a size, shape (spherical) and uniformity which render the final catalyst extremely effective in olefin polymerisation. This morphology is preserved during the heating to solidify the particles, and of course throughout the final washing and drying steps. It is, by contrast, difficult to the point of impossibility to achieve such morphology through precipitation, because of the fundamental uncontrollability of nucleation and growth, and the large number of variables which affect these events.

The electron donor is preferably an aromatic carboxylic acid ester, particularly favoured esters being dioctyl phthalate and bis-(2-ethylhexyl) phthalate. The donor may conveniently be formed in situ by reaction of an aromatic carboxylic acid chloride precursor with a $C_2$-$C_{16}$ alkanol and/or diol. The liquid reaction medium preferably comprises toluene.

Furthermore, emulsifying agents/emulsion stabilisers can be used additionally in a manner known in the art for facilitating the formation and/or stability of the emulsion. For the said purposes e.g. surfactants, e.g. a class based on acrylic or methacrylic polymers can be used. Preferably, said emulsion stabilizers are acrylic or methacrylic polymers, in particular those with medium sized ester side chains having more than 10, preferably more than 12 carbon atoms and preferably less than 30, and preferably 12 to 20 carbon atoms in the ester side chain. Particular preferred are unbranched $C_{12}$ to $C_{20}$ acrylates such as poly(hexadecyl)-methacrylate and poly(octadecyl)-methacrylate.

It has been found that the best results are obtained when the Group 4 metal/Mg mol ratio of the denser oil is 1 to 5, preferably 2 to 4, and that of the disperse phase oil is 55 to 65. Generally the ratio of the mol ratio Group 4 metal/Mg in the disperse phase oil to that in the denser oil is at least 10.

Solidification of the dispersed phase droplets by heating is suitably carried out at a temperature of 70-150° C., usually at 90-110° C.

The finally obtained catalyst is desirably in the form of particles having an average size range of 5 to 200 μm, preferably 10 to 100, more preferably 20 to 50 μm.

The reagents can be added to the aromatic reaction medium in any order. However it is preferred that in a first step the alkoxy magnesium compound is reacted with a carboxylic acid halide precursor of the electron donor to form an intermediate; and in a second step the obtained product is further reacted with the Group 4 metal. The magnesium compound preferably contains from 1 to 20 carbon atoms per alkoxy group, and the carboxylic acid should contain at least 8 carbon atoms.

Reaction of the magnesium compound, carboxylic acid halide and alcohol proceeds satisfactorily at temperatures in the range 20 to 80° C., preferably 50 to 70° C. The product of that reaction, the "Mg complex", is reacted with the Group 4 metal compound at a lower temperature, to bring about the formation of a two-phase, oil-in-oil, product.

The reaction medium used as solvent can be aromatic or a mixture of aromatic and aliphatic hydrocarbons, the latter one containing preferably 5-9 carbon atoms, more preferably 5-7 carbon atoms, or mixtures thereof. Preferably, the liquid reaction medium used as solvent in the reaction is aromatic and is more preferably selected from hydrocarbons such as substituted and unsubstituted benzenes, preferably from alkylated benzenes, even more preferably from toluene and the xylenes, and is most preferably toluene. The molar ratio of said aromatic medium to magnesium is preferably less than 10, for instance from 4 to 10, preferably from 5 to 9.

The alkoxy magnesium compound group is preferably selected from the group consisting of magnesium dialkoxides, complexes of a magnesium dihalide and an alcohol, and complexes of a magnesium dihalide and a magnesium dialkoxide. It may be a reaction product of an alcohol and a magnesium compound selected from the group consisting of dialkyl magnesium, alkyl magnesium alkoxides, alkyl magnesium halides and magnesium dihalides. It can further be selected from the group consisting of dialkyloxy magnesiums, diaryloxy magnesiums, alkyloxy magnesium halides, aryloxy magnesium halides, alkyl magnesium alkoxides, aryl magnesium alkoxides and alkyl magnesium aryloxides.

The magnesium dialkoxide may be the reaction product of a magnesium dihalide such as magnesium dichloride or a dialkyl magnesium of the formula $R'_xR''_yMg$, wherein x+y=2 and x and y are in the range of 0.3-1.7 and each one of R' and R" is a similar or different $C_1$-$C_{20}$ alkyl, preferably a similar or different $C_4$-$C_{10}$ alkyl. Typical magnesium alkyls are ethylbutyl magnesium, dibutyl magnesium, dipropyl magnesium, propylbutyl magnesium, dipentyl magnesium, butylpentylmagnesium, butyloctyl magnesium and dioctyl magnesium. Preferably, R' is a butyl group and R" is an octyl group, i.e. the dialkyl magnesium compound is butyl octyl magnesium, most preferably the dialkyl magnesium compound is $Mg[(Bu)_{1.5}(Oct)0.5]$.

Dialkyl magnesium, alkyl magnesium alkoxide or magnesium dihalide can react with a polyhydric alcohol $R(OH)_m$, with m being in the range of 2-4, or a monohydric alcohol ROH or mixtures thereof.

Typical $C_2$ to $C_6$ polyhydric alcohols may be straight-chain or branched and include ethylene glycol, propylene glycol, trimethylene glycol, 1,2-butylene glycol, 1,3-butylene glycol, 1,4-butylene glycol, 2,3-butylene glycol, 1,5-pentanediol, 1,6-hexanediol, 1,8-octanediol, pinacol, diethylene glycol, triethylene glycol, and triols such as glycerol, methylol propane and pentareythritol.

The aromatic reaction medium may also contain a monohydric alcohol, which may be straight or branched chain. Typical $C_1$-$C_5$ monohydric alcohols are methanol, ethanol, n-propanol, iso-propanol, n-butanol, iso-butanol, sec. butanol, tert. butanol, n-amyl alcohol, iso-amyl alcohol, sec. amyl alcohol, tert. amyl alcohol, diethyl carbinol, akt. amyl alcohol, sec. isoamyl alcohol, tert. butyl carbinol. Typical $C_6$-$C_{10}$ monohydric alcohols are hexanol, 2-ethyl-1-butanol, 4-methyl-2-pentanol, 1-heptanol, 2-heptanol, 4-heptanol, 2,4-dimethyl-3-pentanol, 1-octanol, 2-octanol, 2-ethyl-1-hexanol, 1-nonanol, 5-nonanol, diisobutyl carbinol, 1-decanol and 2,7-dimethyl-2-octanol. Typical >$C_{10}$ monohydric alcohols are n-1-undecanol, n-1-dodecanol, n-1-tridecanol, n-1-tetradecanol, n-1-pentadecanol, 1-hexadecanol, n-1-heptadecanol and n-1-octadecanol. The monohydric alcohols may be unsaturated, as long as they do not act as catalyst poisons.

Preferable monohydric alcohols are those of formula ROH in which R is a $C_2$-$C_{16}$ alkyl group, most preferably a $C_4$-$C_{12}$ alkyl group, particularly 2-ethyl-1-hexanol or 1-octanol.

Preferably, essentially all of the aromatic carboxylic acid ester is a reaction product of a carboxylic acid halide, preferably a dicarboxylic acid dihalide, more preferably an unsaturated, dicarboxylic acid dihalide, most preferably phthalic acid dichloride, with the monohydric alcohol.

The compound of a fourvalent Group 4 metal containing a halogen is preferably a titanium tetrahalide. Equivalent to titanium tetrahalide is the combination of an alkoxy titanium halide and a halogenation agent, which are able to form a titanium tetrahalide in situ. The most preferred halide is the chloride.

As is known, the addition of at least one halogenated hydrocarbon during the catalyst preparation process can lead to further improved catalytic activity. Reactive halogenated hydrocarbons preferably have the formula $R'''X'''_n$ wherein R''' is a $C_1$-$C_{20}$ hydrocarbyl group, particularly a $C_1$-$C_{10}$ aliphatic hydrocarbyl group, X''' is a halogen, preferably chlorine, and n is an integer from 1 to 4.

Such chlorinated hydrocarbons include monochloromethane, dichloromethane, trichloromethane (chloroform), tetrachloromethane, monochloroethane, (1,1)-dichloroethane, (1,2)-dichloroethane, (1,1,1)-trichloroethane, (1,1,2)-trichloroethane, (1,1,1,2)-tetrachloroethane, (1,1,2,2)-tetrachloroethane, pentachloroethane, hexachloroethane, 1-chloropropane, 2-chloropropane, (1,2)-dichloropropane, (1,3)-dichloropropane, (1,2,3) trichloropropane, 1-chlorobutane, 2-chlorobutane, isobutyl chloride, tert. butyl chloride, (1,4)-dichlorobutane, 1-chloropentane and (1,5)-dichloropentane. The chlorinated hydrocarbons may also be unsaturated, provided that the unsaturation does not act as catalyst poison in the final catalyst.

In the above formula, R''' is preferably a $C_1$-$C_{10}$ alkyl group, X''' is preferably chlorine and n is preferably 1 or 2. Preferred compounds include butyl chloride (BuCl), dichloroalkanes such as (1,4)-dichlorobutane, and tertiary butyl chloride.

The catalyst preparation as described herein can be carried out batchwise, semi-continuously or continuously. In such a semi-continuous or continuous process, the solution of the complex of the group 2 metal and said electron donor, which is prepared by reacting the compound of said metal with said electron donor in an organic liquid reaction medium, is mixed with at least one compound of a transition metal, which might be solved in the same or different organic liquid reaction medium. The so obtained solution is then agitated, possibly in the presence of an emulsion stabiliser, and then the agitated emulsion is fed into a temperature gradient reactor, in which the emulsion is subjected to a temperature gradient, thus leading to solidifying the droplets of a dispersed phase of the emulsion. The TMA is preferably contained in the solution of the complex or added to the solution before feeding the agitated solution to the temperature gradient reactor.

When feeding said agitated emulsion to the temperature gradient reactor, an inert solvent, in which the droplets are not soluble, can additionally be fed into that gradient reactor in order to improve the droplet formation and thus leading to a uniform grain size of the particles of the catalyst, which are formed in the temperature gradient reactor when passing through said line. Such additional solvent might be the same as the organic liquid reaction medium, which is used for preparing the solution of the complex of the group 2 metal as explained above in more detail.

The solidified particles of the catalyst can subsequently be recovered by an in-stream filtering unit and are preferably subjected to washing in order to remove unreacted starting components.

The recovered particulate product is washed at least once, preferably at least twice, most preferably at least three times with a hydrocarbon, which preferably is selected from aromatic and aliphatic hydrocarbons, preferably with toluene, particularly with hot (e.g. 90° C.) toluene, which may include a small amount, preferably about 0.01-10 vol % of $TiCl_4$ or an alkyl aluminium chloride, such as diethyl aluminium chloride (DEAC), in it. A further washing step is advantageously performed with heptane, most preferably with hot (e.g. 90° C.) heptane, and a still further washing step with pentane. A washing step typically includes several substeps. A favoured washing sequence is, for example, one washing step with toluene at 90° C., two washing steps with heptane at 90° C. and one or two washing steps with pentane at room temperature.

Finally, the washed catalyst is dried, e.g. by evaporation or flushing with nitrogen.

After washing and drying the catalyst can be stored for further use or can be subjected to further treatment steps or can immediately be fed to a polymerisation reactor.

The catalyst system which is used according to the present invention also comprises an aluminium alkyl compound, preferably of the general formula $AlR_{3-n}X_n$ wherein R stands for straight chain or branched alkyl group having 1 to 20, preferably 1 to 10 and more preferably 1 to 6 carbon atoms, X stands for halogen and n stands for 0, 1, 2 or 3, which aluminium alkyl compound is added, and brought into contact with the droplets of the dispersed phase of the agitated emulsion before recovering the solidified particles of the catalyst.

It is further preferred that at least a part of the aluminium compound is added, in pure form or in the form of a solution, from shortly before the beginning of the emulsion formation until adding it to the washing liquid, e.g. toluene, in such an amount that the final Al content of the particles is from 0.05 to 1 wt %, preferably 0.1 to 0.8 wt % and most preferably 0.2 to 0.7 wt % by weight of the final catalyst particles. The most preferred Al content may vary depending upon the type of the Al compound and on the adding step. For example, in some cases the most preferred amount may be 0.1 to 0.4 wt %.

Still further, preferably tri-($C_1$-$C_6$)-alkyl aluminium compounds are used, triethylaluminium being most preferred.

In Ziegler-Natta catalysts aluminium alkyl compounds are used as cocatalysts, i.e. for activating the catalyst. During activation of polypropylene catalysts, alkyl aluminium does not only reduce and alkylate the active metal, but it has also influence on the donor composition. It is well-known that alkyl aluminium compounds can remove carboxylic acid esters, which are used as internal donors. Simultaneously, external donors can be fixed on the catalyst. Typically, triethyl aluminium (TEN) is used as cocatalyst and silanes as external donors as is disclosed e.g. in articles Sacci, M. C.; Forlini, F.; Tritto I. And Locatelli P., Macromolecules, 1996, 29, 3341-3345 and Sacci, M. C.; Tritto, I.; Shan, C. and Mendichi, R., Macromolecules, 1991, 24, 6823-6826.

In the catalysts used in the present invention, the internal donor, preferably bis-(2-ethylhexyl) phthalate (DOP), can be significantly extracted from the catalyst with the use of the alkyl aluminium compound. The extraction level is dependent on the concentration of the aluminium alkyl. The higher the concentration, the more of the internal donor can be extracted. Further, the addition of the external donor together with aluminium alkyl improves the donor exchange. The longer the reaction time is, the more external donor is bound on the catalyst.

Particularly preferred external donors are any of the following: cyclohexyl methyl dimethoxy silane, dicyclopentyl dimethoxy silane, diisopropyl dimethoxysilane, di-isobutyl dimethoxysilane and di-tert.-butyl dimethoxysilane. Most preferred are cyclohexyl methyl dimethoxy silane and dicyclopentyl dimethoxy silane, cyclohexyl methyl dimethoxy silane being particularly preferred.

It is preferred, that a solution containing alkyl aluminium and external donor in an organic solvent, e.g. pentane, are added to the catalyst after solidification of the catalyst particles.

The catalyst which is obtained by the above described process is a non-supported Ziegler-Natta catalyst. Non-supported catalysts do not use any external carrier, contrary to conventional catalysts, e.g. conventional Ziegler-Natta catalysts, which are e.g. supported on silica or $MgCl_2$.

Further preferred embodiments of the catalyst system production include all preferred embodiments as described in WO 03/000754.

It is specifically preferred that the inventive polyolefin compositions—when manufactured into a cast film having a thickness of 80 μm, show a transparency expressed as Δ haze measured as the difference between the haze value after sterilisation at 121° C. for 30 min and the haze value before sterilisation of not more than 10.0%. Preferred ranges for Δ haze may be from 0.1 to 8.0%, more preferably 0.1 to 7.0%.

Sterilisation is usually carried out between 120° C. and 130° C., preferably at 121° C. for 10 minutes to 1 hour, preferably for 30 min.

In addition, the inventive polyolefin composition may preferably have a flexural modulus below 1000 MPa, more preferred below 900 MPa, measured according to ISO 178. The flexural modulus of the polyolefin composition is preferably at least 300 MPa.

Furthermore, in the present invention the polyolefin composition preferably has a crystallinity as determined by differential scanning calorimetry (DSC) of 20 to 55%, more preferably of 30 to 50%.

The crystallinity of a polymer indicates the degree of inter- and intra-molecular order of the polymer components. It can be calculated from the melting enthalpy $\Delta H_m$ in a standard DSC experiment according to ISO 3146 run at a heating rate of 10° C./min, assuming a melting enthalpy of 209 J/g for a completely crystalline propylene homopolymer (see e.g. the following reference: Markus Gahleitner, Pirjo Jääskeläinen, Ewa Ratajski, Christian Paulik, Jens Reussner, Johannes Wolfschwenger & Wolfgang Neißl, Propylene-Ethylene Random Copolymers: Comonomer Effects on Crystallinity and Application Properties, J. Appl. Polym. Sci. 95 (2005) 1073-81).

It is further preferred that the content of xylene solubles of the inventive polyolefin compositions is from 0.5 to 10 wt. %, more preferred from 1 to 8 wt. %.

The inventive polyolefin compositions are typically used for obtaining films from which articles for the desired end-use are manufactured. The films may be prepared by any process known to the skilled person, but are preferably produced by a cast film process or a blown film process. A roll stack process may also be used.

The films may be produced with varying thicknesses, preferably between 20 and 200 µm. At a film thickness of 50 µm cast films comprising the polyolefin compositions according to the present invention may suitably have a tensile modulus in the machine direction, measured according to ISO 527-2 of not more than 800 MPa.

At a film thickness of 80 µm cast films comprising the polyolefin compositions according to the present invention may suitably have the following characteristics:
a haze value according to ASTM D 1003 of the films as-produced of not more than 2%, and
a haze value according to ASTM D 1003 after sterilisation at 121° C. for 30 min of not more than 10%.

1. MEASUREMENT METHODS a) Melt Flow Rate

The melt flow rate is determined according to ISO 1133 and it is indicated in g/10 min. The MFR is an indication of the flowability and thus the processability of the polymer. The higher the melt flow rate, the lower the viscosity of the polymer. The MFR of propylene compositions and polymers is measured with a load of 2.16 kg at 230° C.

b) Melting Temperature $T_m$

The melting temperature is determined by differential scanning calorimetry (DSC) according to ISO 3146; it is taken as the maximum of the melting peak over the temperature during the second heating scan of a sequence heating/cooling/heating of +10/−10/+10 K/min between ambient temperature and 210° C.

c) Ethylene Content

The ethylene content was determined using Fourier transform infrared spectroscopy (FTIR) using the peak height at 733 $cm^{-1}$ as a measure of ethylene content. The measurement is carried out on compression moulded films of 50 µm thickness, using a calibration curve established based on $^{13}C$-NMR measurements in line with EN 17025 d) Tensile Modulus of Films

The tensile modulus was determined in machine and transverse direction on 50 µm thick cast films according to ISO 527-2.

e) Haze

Haze of cast films was measured according to ASTM D 1003/92 on 80 µm thick cast films and on injection molded specimens of 60×60×2 mm prepared according to EN ISO 1873-2.

Δ Haze was determined by measuring the haze value before and after sterilisation at 121° C. for 30 min. and calculating the difference between these values.

f) Xylene Solubles (XS or XCS) Content

For the determination of the XS fraction, 2.0 g of polymer is dissolved in 250 ml of p-xylene at 135° C. under stirring. After 30±2 min the solution is allowed to cool for 5 min at ambient temperature and then allowed to settle for 30 min at 23±0.5° C. The solution is filtered with a paper filter into two 100 ml flasks. The solution in the first 100 ml flask is evaporated in nitrogen flow and the residue is dried under vacuum at 90° C. until constant weight is reached. The xylene soluble (XS) fraction is then calculated using the following equation:

$$XS[\%] = (100 m_1 v_0)/(m_0 v_1)$$

wherein $m_0$ is the initial polymer amount [g], $m_1$ is the weight of the residue [g], $v_0$ is the initial volume [ml] and $v_1$ the volume of the analysed sample [ml].

g) Polydispersity (Mw/Mn)

The determination of weight average molecular weight ($M_w$) and number average molecular weight ($M_n$) and the polydispersity=($M_w/M_n$) by size exclusion chromatography (SEC): $M_w$, $M_n$ and ($M_w/M_n$) were determined with a Millipore Waters ALC/GPC operating at 135° C. and equipped with two mixed beds and one 107 Å TSK-Gel columns (TOSOHAAS 16S) and a differential refractometer detector. The solvent 1,2,4-trichlorobenzene was applied at flow rate of 1 ml/min. The columns were calibrated with narrow molecular weight distribution polystyrene standards and narrow and broad polypropylenes. Reference is also made to ISO 16014.

h) Flexural Modulus

The flexural modulus was determined according to ISO 178 on injection molded specimens of 60×60×2 mm prepared according to EN ISO 1873-2.

i) Broadness B

Rheological methods can be used to determine a molecular weight distribution, based on the measurement of G' (storage modulus), G" (loss modulus) and Gc (crossover modulus) by way of a dynamic test carried out e.g. with a RMS-800 rheometric mechanical spectrometer. A sample is prepared with one gram of polymer, said sample having a thickness of 3 mm and a diameter of 25 mm; it is then placed in the above mentioned apparatus and the temperature is then gradually increased until it reaches a temperature of 200° C. after 90 minutes. At this temperature one carries out the test where G' and G" are measured in function of the frequency.

According to the Cox/Merz-relation (Cox and Merz, J. Polym. Sci. 28, 619, 1958) the complex viscosity $\eta^*$ resulting from storage and loss modulus by $$\eta^* = \frac{(G'^2 + G''^2)^{1/2}}{\gamma'}$$

is taken as the shear viscosity $\eta(\dot{\gamma})$ for $\omega=\dot{\gamma}$; $\omega$ here being the frequency and $\gamma'$ the shear rate.

The molecular weight distribution may then be characterised by the broadness parameter B, determined by the Carreau-Yasuda equation:

$$\eta(\dot{\gamma})=\eta_0[1+(\lambda\dot{\gamma})^B]^{(n-1)/B}$$

with $\eta_0$ being the zero shear viscosity, $\lambda$ the characteristic relaxation time identical to the inverse of the critical shear rate $\gamma_{crit}$ (being the shear rate at the intersection between the zero shear rate line at low and the power law region at high shear rates), n the "power law index" at high shear rates and B the transition broadness parameter. The model parameters of this flow curve model can be correlated to characteristic quantities of the molecular weight distribution (Bernreitner et al., Polym. Testing 11, 89, 1992). Details of the parameter determination can also be found in the aforementioned literature.

In the present invention the broadness parameter B is preferably at least 0.68, more preferably at least 0.7.

j) Randomness R

The randomness R as used herein is defined as the ratio of the amount of randomly incorporated ethylene to the total amount of ethylene of the propylene-ethylene random copolymer. The total amount of ethylene is the sum of the respective amounts of randomly incorporated ethylene and the amount of ethylene which is incorporated in a blocky manner. Both amounts ("random-ethylene" and "blocky-ethylene") are determined with FTIR. The total concentration of ethylene corresponds to the peak height at 733 $cm^{-1}$. The concentration of blocky-ethylene corresponds to the area of a peak at 720 $cm^{-1}$. The concentration of random-ethylene is calculated as the difference of total ethylene minus blocky-ethylene. The respective amounts of ethlyene are determined from the FTIR spectrum by using calibration curves established with $^{13}$C-NMR.

The area of a peak at 720 $cm^{-1}$ is determined in the following way:
- a first spectrum of the sample of which the Randomness is to be determined is recorded
- a second spectrum of a sample which consists of the XCU (insoluble in cold xylene) portion of a random copolymer (the copolymer having ca. 4 wt % ethylene) is recorded. The XCU portion of a random copolymer contains only randomly incorporated ethylene.
- The second spectrum is electronically increased/decreased, such that its peak at 733 $cm^{-1}$ has the same height as that of the first spectrum.
- The thus modified second spectrum is subtracted from the first spectrum.
- The peak area of a peak at 720 $cm^{-1}$ of the first spectrum can now be measured and the corresponding blocky-ethylene content determined with the aid of a calibration curve.

2. EXAMPLES (a) Preparation of the Catalyst

Preparation of the Mg-Complex

In a 150 l steel reactor 19.4 kg of 2-ethyl hexane-1-ol were added at 20° C. 56.0 kg of a 20% BOMAG A (Tradename) [Mg(Bu)$_{1.5}$(Oct)$_{0.5}$] solution in toluene were then slowly added to the well stirred alcohol. The temperature of the mixture was then increased to 60 C, and the reactants were allowed to react for 30 minutes at this temperature. After addition of 5.5 kg of 1,2-phthaloyl dichloride, the reaction mixture was stirred at 60° C. for another 30 minutes to ensure complete reaction. 13.8 kg of 1-chloro butane were then added at 60° C., and stirring at this temperature was continued for 30 minutes. After cooling to room temperature a yellow solution was obtained.

Preparation of the Catalyst 100 ml titanium tetrachloride were placed in a 1 l reactor equipped with a mechanical stirrer. Mixing speed was adjusted to 110 rpm. After addition of 50 ml n-heptane, 180 ml of the Mg-complex solution was added to the well-stirred reaction mixture at 25° C. within 10 minutes. After addition a dark red emulsion was formed. After addition of the Mg-complex, 15 ml of toluene solution containing 45 mg polydecene was added. Then 10 ml of Viscoplex® 1-254 was added. 10 min after addition the temperature of the reactor was increased to 90° C. and stirring at this temperature was continued for 30 min. After settling and filtering, the solid was washed with 200 ml of toluene containing 0.1 vol % diethyl aluminium chloride at 90° C. for 35 min. Then the washings were continued with two times 150 ml heptane for 10 min. Then the catalyst was taken out from the reactor to a separate drying vessel as a slurry with 100 ml of heptane. Finally, the solid catalyst was dried at 60° C. by purging nitrogen through the catalyst bed.

(b) Production of Polyolefin Compositions and Properties Thereof

A continuous multistage process was used to produce the polyolefin compositions. The process comprised a prepolymerisation step, a loop reactor and a fluidized bed gas phase reactor.

The catalyst system (catalyst, triethyl aluminium (TEN) and cyclohexyl methyl dimethoxy silane (C-Donor)) and propylene were fed into the prepolymerisation reactor which was operated at 30° C. The prepolymerised catalyst was used in the subsequent polymerisation reactors.

Propylene, ethylene and hydrogen and the prepolymerised catalyst were fed into the loop reactor which was operated as bulk reactor at temperatures between 70 and 75° C. and a pressure of 55 bar. The monomer feed was 50-100 kg/h into the loop reactor. The catalyst feed was 20-25 g/ton monomer. TEAl feed was 0.2-0.3 kg/ton monomer. A TEAl/donor ratio of 40:1 [mol/mol] was selected. A first propylene-ethylene random copolymer (A) was produced in the loop reactor.

Then, the polymer slurry stream was fed from the loop reactor into the gas phase reactor which was operated at a temperature of 85° C. and a pressure of 20 bar. More propylene, ethylene and hydrogen were fed into the gas phase reactor to control the desired properties of the final polymer. The second propylene-ethylene random copolymer (B) was produced in the gas phase reactor.

Cast films were produced on a single screw extruder with a barrel diameter of 30 mm and a slot die of 200×0.5 mm in combination with a chill- and take-up roll. Melt temperature was 260° C. in the die. The chill roll and the take-up roll were kept at 15° C. Film thicknesses of 50 μm and 80 μm were adjusted by varying the ratio between the extruder output and take-off speed.

The following additives were given to polyolefin compositions used for the production of the films according to the invention and to the polyolefin compositions used for the production of the comparative films before film production: 0.05 wt. % calcium stearate, 0.05 wt. % Irganox® 1010, 0.05 wt. % Irgafos® 168, 0.2 wt. % erucic acid amide, and 0.18 wt. % synthetic silica (Sylobloc® 45).

The results are shown in Table 1 for Examples 1 and 2 (E1 and E2) as well as for Comparative Examples 1 and 2 (C1 and C2).

TABLE 1

| | Loop | | | GPR | | | MFR Ratio | |
|---|---|---|---|---|---|---|---|---|
| | MFR g/10 min | C2 wt % | fraction % | MFR g/10 min | C2 wt % | fraction % | Loop/GPR | Randomness R |
| E1 | 22.6 | 2.0 | 50.6 | 11.8 | 3.0 | 49.4 | 1.9 | 0.968 |
| C1 | 14.0 | 1.9 | 46.1 | 9.9 | 3.1 | 53.9 | 1.4 | 0.971 |
| E2 | 24.4 | 1.9 | 47.1 | 11.6 | 3.1 | 52.9 | 2.1 | 0.970 |
| C2 | 14.2 | 2.0 | 49.7 | 9.9 | 3.2 | 50.3 | 1.4 | 0.972 |

| | DSC | | SEC | | | Rheology 200° C. | | |
|---|---|---|---|---|---|---|---|---|
| | Tm °C. | Hm J/g | Mw kg/mol | Mn kg/mol | Mw/Mn | η0(CY) Pa·s | B(CY) | XCS wt % |
| E1 | 143.2 | 86.2 | 295 | 66 | 4.5 | 2100 | 0.72 | 3.8 |
| C1 | 143.9 | 85.7 | 306 | 70 | 4.4 | 2410 | 0.66 | 4.5 |
| E2 | 143.5 | 82.9 | 295 | 66 | 4.5 | 2130 | 0.70 | 4.1 |
| C2 | 142.8 | 87.2 | 301 | 69 | 4.4 | 2380 | 0.66 | 4.3 |

| | molded specimens | | 50 μm cast film | | 80 μm cast film | |
|---|---|---|---|---|---|---|
| | 60 × 60 × 2 mm | FM molded | Tensile Modulus | | Optics | |
| | Haze % | FM MPa | MD MPa | TD MPa | Haze bst. % | Haze st. % |
| E1 | 82.7 | 898 | 558.9 | 563.0 | 0.2 | 7.2 |
| C1 | 82 | 864 | 540.0 | 543.1 | 0.2 | 15.9 |
| E2 | 81.5 | 892 | 550.2 | 565.2 | 0.8 | 8 |
| C2 | 81.2 | 856 | 534.6 | 542.0 | 0.9 | 16.2 |

Parameters:
MFR 230° C./2.16 kg
C2 Ethylene content
XCS Xylene cold solubles
FM Flexural modulus
bst. Before sterilisation
st. sterilised 121° C./0.5 h

We claim:

1. A polyolefin composition comprising
   (A) a first propylene-ethylene random copolymer having an ethylene content $CM_A$ of 1.0-6 wt % and an MFR(A) measured according to ISO 1133 of 5-40 g/10 min and
   (B) a second propylene-ethylene random copolymer, wherein the polyolefin composition has an ethylene content $CM_{AB}$ of 2.5-6 wt % and an MFR(AB) measured according to ISO 1132 of 3-20 g/10 min with the proviso that $CM_{AB}>CM_A$ and MFR(A)/MFR(AB)>1.45 and where the polyolefin composition further has a randomness R of the ethylene distribution in the polymer chain of $\geq 0.945$.

2. A polyolefin composition comprising
   (A) a first propylene-ethylene random copolymer having an ethylene content $CM_A$ 1.0-6 wt % and an MFR(A) measured according to ISO 1133 of 5-40 g/10 min and
   (B) a second propylene-ethylene random copolymer, wherein
   the polyolefin composition has an ethylene content $CM_{AB}$ of 2.5-6 wt % and an MFR(AB) measured according to ISO 1132 of 3-20 g/10 min with the proviso that $CM_{AB}>CM_A$ and where the polyolefin composition shows a broadness B of 0.67 or more and where the polyolefin composition further has a randomness R of the ethylene distribution in the polymer chain of $\geq 0.945$.

3. A polyolefin composition according to claim 1, having a polydispersity ($M_w/M_n$) of not less than 4.

4. A polyolefin composition according to claim 1, wherein the polyolefin composition comprises 20-80 wt % propylene-ethylene random copolymer (A) and 80-20 wt % propylene-ethylene random copolymer (B).

5. A polyolefin composition according to claim 1, wherein the melting temperature $T_m$ in ° C., determined by differential scanning calorimetry (DSC), satisfies the relationship $T_m \leq 162.5 - 5.4 * CM_{AB}$, wherein $CM_{AB}$ denotes the ethylene content in wt % of the polyolefin composition.

6. A polyolefin composition according to claim 1, wherein the polyolefin composition has a melting temperature $T_m$ in ° C., determined by differential scanning calorimetry (DSC), of not less than 125° C. and below 160° C.

7. A polyolefin composition according to claim 1, wherein, when manufactured into a cast film having a thickness of 80 μm, the polyolefin composition shows a transparency expressed as Δ haze measured as the difference between the haze value, measured according to ASTM D 1003, after sterilisation at 121° C. for 30 min and the haze value before sterilisation of not more than 10.0%.

8. A process for producing a polyolefin composition comprising,
   A) preparing an olefin polymerisation catalyst by
      a) preparing a solution of a complex of a Group 2 metal and an electron donor by reacting a compound of said metal with said electron donor or a precursor thereof in an organic liquid reaction medium;
      b) adding said solution of said complex to at least one compound of a transition metal of any of groups 4-6 to produce an emulsion the dispersed phase of which contains more than 50 mol % of the Group 2 metal in said complex;
      c) agitating the emulsion, optionally in the presence of an emulsion stabilizer, in order to maintain the droplets of said dispersed phase within an average particle size range of suitably 5 to 200 μm, preferably 10 to 100 μm, even more preferably 20 to 50 μm;
      d) solidifying said droplets of the dispersed phase; and
      e) recovering the obtained solidified particles of the olefin polymerisation catalyst,
   B) producing a first propylene-ethylene random copolymer (A) having an ethylene content $CM_A$ of 0.5-8 wt % and an MFR(A) of 5-40 g/10 min by polymerising propylene and ethylene in the presence of an olefin polymerisation catalyst system comprising the
      (B1) olefin polymerisation catalyst
      (B2) a cocatalyst including an aluminium alkyl compound, and
      (B3) an external donor including a silane compound, and
   C) producing a second propylene-ethylene random copolymer (B) by polymerising propylene and ethylene in the presence of the olefin polymerisation catalyst system, such that
the polyolefin composition has an ethylene content $CM_{AB}$ of 1-10 wt % and an MFR(AB) of 3-20 g/10 min with the proviso that $CM_{AB}>CM_A$ and MFR(A)/MFR(AB)>1.45 and a randomness R of the ethylene distribution in the polymer chain of ≧0.945.

9. A process for producing a polyolefin composition comprising,
   A) preparing an olefin polymerisation catalyst by
      a) preparing a solution of a complex of a Group 2 metal and an electron donor by reacting a compound of said metal with said electron donor or a precursor thereof in an organic liquid reaction medium;
      b) adding said solution of said complex to at least one compound of a transition metal of any of groups 4-6 to produce an emulsion the dispersed phase of which contains more than 50 mol % of the Group 2 metal in said complex;
      c) agitating the emulsion, optionally in the presence of an emulsion stabilizer, in order to maintain the droplets of said dispersed phase within an average particle size range of suitably 5 to 200 μm, preferably 10 to 100 μm, even more preferably 20 to 50 μm;
      d) solidifying said droplets of the dispersed phase; and
      e) recovering the obtained solidified particles of the olefin polymerisation catalyst,
   B) producing a first propylene-ethylene random copolymer (A) having an ethylene content $CM_A$ of 0.5-8 wt % and an MFR(A) of 5-40 g/10 min by polymerising propylene and ethylene in the presence of an olefin polymerisation catalyst system comprising the
      (B1) olefin polymerisation catalyst
      (B2) a cocatalyst including an aluminium alkyl compound, and
      (B3) an external donor including a silane compound, and
   C) producing a second propylene-ethylene random copolymer (B) by polymerising propylene and ethylene in the presence of the olefin polymerisation catalyst system, such that
the polyolefin composition has an ethylene content $CM_{AB}$ of 1-10 wt % and an MFR(AB) of 3-20 g/10 min with the proviso that $CM_{AB}>CM_A$ and the polyolefin composition has a broadness B of 0.67 or more and a randomness R of the ethylene distribution in the polymer chain of ≧0.945.

10. An article comprising, a polyolefin composition having
   (A) a first propylene-ethylene random copolymer having an ethylene content $CM_A$ of 1.0-6 wt % and an MFR(A) measured according to ISO 1133 of 5-40 g/10 min and
   (B) a second propylene-ethylene random copolymer, wherein
   the polyolefin composition has an ethylene content $CM_{AB}$ of 2.5-6 wt % and an MFR(AB) measured according to ISO 1132 of 3-20 q/10 min with the proviso that $CM_{AB}>CM_A$ and MFR(A)/MFR(AB)>1.45 and where the polyolefin composition further has a randomness R of the ethylene distribution in the polymer chain of >0.945.

11. Article according to claim 10, which is a blown film or cast film.

12. Article according to claim 10, wherein the article is for food packaging or a medical article.

13. Article according to claim 10, wherein the article is selected from the group consisting of a food wrapping film and a container, e.g. a conduit or a tube, for holding and/or storing and/or guiding a therapeutic fluid, and an article for holding and/or storing and/or guiding blood and a constituent thereof.

14. A polyolefin composition according to claim 2, having a polydispersity ($M_w/M_n$) of not less than 4.

15. A polyolefin composition according to claim 2, wherein the polyolefin composition comprises 20-80 wt % propylene-ethylene random copolymer (A) and 80-20 wt % propylene-ethylene random copolymer (B).

16. A polyolefin composition according to claim 2, wherein the melting temperature $T_m$ in ° C., determined by differential scanning calorimetry (DSC), satisfies the relationship $T_m<162.5-5.4*CM_{AB}$, wherein $CM_{AB}$ denotes the ethylene content in wt % of the polyolefin composition.

17. A polyolefin composition according to claim 2, wherein the polyolefin composition has a melting temperature $T_m$ in ° C., determined by differential scanning calorimetry (DSC), of not less than 125° C. and below 160° C.

18. A polyolefin composition according to claim 2, wherein, when manufactured into a cast film having a thickness of 80 μm, the polyolefin composition shows a transparency expressed as Δ haze measured as the difference between the haze value, measured according to ASTM D 1003, after sterilisation at 121° C. for 30 min and the haze value before sterilisation of not more than 10.0%.

* * * * *

UNITED STATES PATENT AND TRADEMARK OFFICE
CERTIFICATE OF CORRECTION

PATENT NO. : 8,288,481 B2
APPLICATION NO. : 12/733774
DATED : October 16, 2012
INVENTOR(S) : Joachim Fiebig et al.

It is certified that error appears in the above-identified patent and that said Letters Patent is hereby corrected as shown below:

In the Specifications:

Column 14,
Line 24 "(TEN)" should be -- (TEAI) --.

Column 18,
Line 45 "(TEN)" should be -- (TEAI) --.

In the Claims:

Column 22,
Line 24, Claim 10, "3-20q/10min" should be -- 3-20g/10min --.

Signed and Sealed this
Sixteenth Day of April, 2013

Teresa Stanek Rea
*Acting Director of the United States Patent and Trademark Office*